United States Patent [19]

Kobayashi et al.

[11] Patent Number: 4,691,258
[45] Date of Patent: Sep. 1, 1987

[54] TEMPERATURE COMPENSATING MECHANISM FOR POSITIONING OF A MAGNETIC HEAD OF A MAGNETIC DISK DRIVE

[75] Inventors: Masashi Kobayashi; Keishi Takahashi, both of Fujisawa; Kimiya Yoneyama, Yokohama, all of Japan

[73] Assignee: International Business Machines Corporation, Armonk, N.Y.

[21] Appl. No.: 709,942

[22] Filed: Mar. 8, 1985

[30] Foreign Application Priority Data

Mar. 30, 1984 [JP] Japan .................. 59-61307

[51] Int. Cl.⁴ .............. G11B 5/02; G11B 5/012; G11B 5/54; G11B 21/02
[52] U.S. Cl. ..................... 360/97; 360/105; 360/77
[58] Field of Search ............... 360/97, 99, 105, 106, 360/77, 78

[56] References Cited

U.S. PATENT DOCUMENTS

| | | | |
|---|---|---|---|
| 4,163,996 | 8/1979 | Kaseta et al. | 360/97 |
| 4,185,310 | 1/1980 | Kasetal et al. | 360/97 |

FOREIGN PATENT DOCUMENTS

| | | | |
|---|---|---|---|
| 0055568 | 7/1982 | European Pat. Off. | 360/97 |
| 0129973 | 1/1985 | European Pat. Off. | 360/97 |
| 58-77065 | 5/1983 | Japan | 360/105 |

*Primary Examiner*—Stuart N. Hecker
*Assistant Examiner*—Alyssa H. Bowler
*Attorney, Agent, or Firm*—Robert W. Lahtinen

[57] ABSTRACT

A magnetic head actuator assembly for a disk drive, having dissimilar materials with different linear expansion coefficients, is provided with thermal compensation. The movable member of the actuator assembly has spring elements attached at spaced locations thereon and is associated with a cooperating pulley that drives a band. The band ends are connected to the spring elements such that rotation of the pulley imparts motion to the movable member. The spring coefficient of the band, spring, and connector structure between the pulley and one spaced location and the spring coefficient of the band, spring, and connecting structure between the pulley and the other of the spaced locations on the movable member are chosen so that the displacement of the magnetic head with respect to a record track on a cooperating disk surface caused by temperature variation is compensated. In one modification, a bimetal is used to replace a spring element in the thermal compensating system.

3 Claims, 6 Drawing Figures

TEMPERATURE COMPENSATING MECHANISM FOR POSITIONING OF A MAGNETIC HEAD OF A MAGNETIC DISK DRIVE

FIELD OF THE INVENTION

This invention relates to a magnetic disk drive, and more particularly to a temperature compensating mechanism for positioning a magnetic head on a magnetic disk, to write or read information to or from the disk.

BACKGROUND OF THE INVENTION

A Winchester type magnetic disk drive has a hard magnetic disk with a diameter of 5.25 inches or 8 inches, several hundred circular recording tracks per inch and spacing of only several tens microns between adjacent tracks. In order to satisfactorily function, such a magnetic disk drive is required to accurately position the magnetic head, which writes and reads information to and from these record tracks, to the tracks within a predetermined error or tolerance, for example, a tolerance of several microns.

Even if positioning can be performed within the predetermined tolerance at a certain temperature, a temperature increase or decrease causes each component constituting the magnetic disk drive to expand or contract due to its linear expansion coefficient, which temperature change varies the relative positioning between the track and the magnetic head, so that the magnetic head can no longer be positioned within the allowable tolerance. If it is assumed that all the components constituting the magnetic disk drive have the same linear expansion coefficient, displacement of the magnetic head relative to the track can be prevented because all such components expand or contract in the same ratio, and do not vary the relative positioning between the track and the magnetic head. However, this does not occur in practice because components of material with various linear expansion coefficients are used.

Conventionally, the relative displacement between the magnetic head and track due to temperature change is compensated by incorporating a servo system in the magnetic disk drive. However, this increases the cost of the drive and therefore is difficult to employ in a relatively low cost magnetic disk drive.

Various low cost temperature compensating mechanisms for positioning magnetic heads have been proposed using mechanical elements. One of them is disclosed in the Japanese Laid-open Patent Specification No. 1695/80, in which a head actuator for positioning the magnetic head to a predetermined track on the magnetic disk comprises a step motor, two metal bands and a swivel arm, a pulley mounted on the shaft of said step motor housing and coil springs exerting tensile force on the metal bands, whereby temperature compensation is accomplished.

SUMMARY OF THE INVENTION

Although the temperature compensating mechanism disclosed in the Japanese Laid-open Patent Specification No. 1695/80 performs the temperature compensation with the coil springs, it fails to indicate how to perform optimum temperature compensation in practical use and how to design or select coil springs that perform optimum temperature compensation. That is, how to select the length, the number of turns, the spring coefficient, the linear expansion coefficient or the like for the optimum coil springs. Also, since coil springs in the prior art are housed in the pulleys, it is necessary to remove the coil springs from the pulleys and replace them everytime different springs are selected to optimize performance. This is cumbersome, causes complex construction, and leads to a cost disadvantage. In addition, the prior art requires two metal bands, which further complicates construction and increases cost.

An object of the invention is to provide a temperature compensating mechanism for positioning the magnetic head of a magnetic disk drive that is low in cost and easily adjusted.

The above object is attained by the magnetic disk drive temperature compensating mechanism of the present invention comprising a movable member supporting the magnetic head, a pulley for driving said movable member, and a connecting structure including a band connecting said pulley and two spaced points of said movable member with at least one spring exerting The spring coefficient of one half of said tensile force on said band. connecting structure for connecting the pulley and either one of the two points of the movable member and spring coefficient of the other half of the connecting structure for connecting the pulley and another point of the movable member are chosen so that the temperature change induced displacement between the magnetic head and a record track is compensated by the force generated by the connecting structure due to change in length between the two points of the movable member and the connecting structure that is caused by said temperature change.

When the temperature changes, an embodiment of the temperature compensating mechanism according to the invention causes relative change in length between the distance of two spaced points of the movable member and the length of connecting structure secured to said two points. Since the spring coefficient for one half of the connecting structure differs from that of the other half bordering on the pulley, the force caused in one half of the connecting structure by said relative change in the length differs from that in the other half bordering the pulley. Thus, the difference in these forces moves the movable member to a location where the force is balanced. The amount of such movement is the amount of temperature compensation to offset the relative position change between the magnetic head and the record track caused by the temperature change.

Choosing the spring coefficient for the two halves of the connecting structure bordering on the pulley may be attained by choosing spring coefficients for the springs that serve to secure ends of the band of the connecting structure to the two spaced points of the movable member. Said springs may be leaf springs, of which spring coefficients can be easily chosen by changing their length and thickness.

The relative change in length between the connecting structure and the two points of the movable member due to temperature variation may be caused by the differing linear expansion coefficient of material constituting the band of the connecting structure and the material constituting the movable member between the two points. For example, the material constituting the movable member between the two points may be aluminum with a relatively high linear expansion coefficient, while the material constituting the band may be stainless steel with a relatively low linear expansion coefficient.

Another embodiment of the invention employs a bimetal as the spring of the connecting structure. The bimetal deforms under temperature change, thereby generating force through the connecting structure for moving the movable member to achieve temperature compensation. Furthermore, if it is so arranged that the relative change in length is not caused by the temperature change between the length of the connecting structure and the distance between the two points of the movable member except by the bimetal, the difference of the amount of temperature compensation for the inner and the outer tracks on the magnetic disk, which is observed in the previous embodiment, can be eliminated to make it always constant regardless the location of the tracks so as to provide the optimum amount of compensation at any track location.

DETAILED DESCRIPTION

Figure 1:
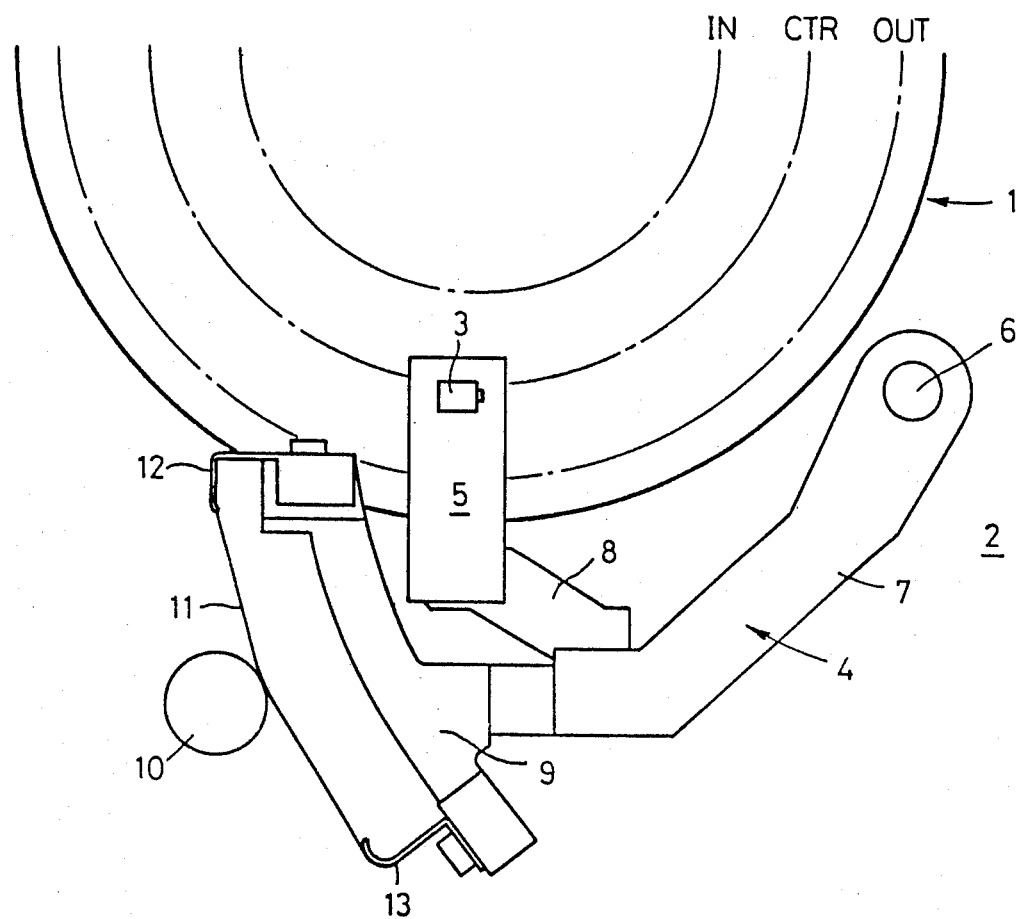
FIG. 1 is a plan view illustrating the temperature compensating mechanism for positioning a magnetic disk drive magnetic head in accordance with a first embodiment of the invention.
Figure 2:
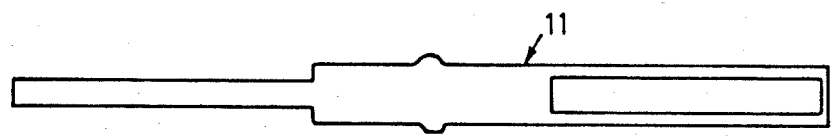
FIG. 2 shows a plan view of a band used in the embodiment of FIG. 1.

FIG. 1 shows a magnetic disk drive mounted with the temperature compensation mechanism for positioning of the magnetic head according to an embodiment of the invention, wherein 1 is a hard magnetic disk that is rotated by a spindle motor (not shown) mounted on a base 2 of aluminum. A number of record tracks are coaxially arranged on the magnetic disk 1, the radially innermost track being indicated by IN, the outermost track by OUT, and the central track by CTR. The magnetic disk 1 itself is made of aluminum, each surface of which is coated with magnetic material such as iron oxide, and then coated with a protective film. Assuming that the magnetic disk 1 has a diameter of 5.25 inches, its one surface is arranged with several hundred record tracks in a density of several hundred tracks per inch, with the spacing of only several tens microns between each track. A magnetic transducer head 3 magnetically writes or reads information in or from the record track. The magnetic head 3 is slightly floated (about 0.5 μm) by air flow over the magnetic disk rotating at high speed (about 3,600 rpm), and accesses each track to perform writing or reading of information. The magnetic head 3 has a well-known construction. The access to each track by the magnetic head 3 is performed through a movable member 4 that movably supports the magnetic head. The movable member 4 consists of a head suspension 5 directly supporting the head 3; and actuator arm 7, one end of which is mounted on a pivot shaft 6 pivotably supported by the base 2; a head arm 8 connecting the actuator arm 7 and the head suspension 5; and a spring support 9 fixed on the other end of the actuator arm 7 so as to extend in substantial arc. The movable member as a whole is supported by a pivot shaft 6 parallel to the axis of rotation of the magnetic disk 1, and is rotatable on the base 2 about the shaft 6. The movable member 4 is made of aluminum except the head suspension 5 that is made of stainless steel. A pulley 10 has a rotating shaft parallel to the axis of rotation of magnetic disk 1. Said shaft of the pulley is connected to the step motor (not shown). The outer cylindrical surface of the pulley 10 is wound with a metal band 11 such as the one shown in FIG. 2. The band 11 is spot welded at its central bulge to the pulley 10 so that the welded portions do not overlap with the other portions of band 11. The elongated narrow portion at one end of the band is inserted into the elongated hole at the other end to be wound around the outer surface of the pulley 10. Each end of band 11 extends in a substantially opposite tangential direction from the outer surface of the pulley 10, and is secured to one of two spaced points of the spring support 9 through leaf like springs 12 or 13. The inner and the outer ends of the band 11 (the inner end means that nearest to the center of the magnetic disk 1, while the outer end means that farthest from the center) are spot welded to the inner and the outer springs 12 and 13, respectively. Springs 12 and 13 are bent at ends in contact with band 11 so as not to damage the band and particularly the band ends close to the spring support 9, which are secured to support 9 by bolts. Springs 12 and 13 exert a tensile force on band 11. Their spring coefficients can be freely selected by changing their material, thickness and length (the height projected from the spring support 9). The pulley 10, the band 11 and the springs 12 and 13 are made of stainless steel. The stainless steel has a lower linear expansion coefficient than aluminum.

The movable member 4, the pulley 10, the band 11, the springs 12 and 13 and the step motor (not shown) constitute the head actuator that causes the magnetic head to access a desired record track on the magnetic disk. When the step motor (not shown) receives a signal and rotates counterclockwise (or clockwise) in a predetermined angle, it causes the pulley 10 to rotate by the same angle in the same direction, the outer side (or the inner side ) of the band 11 to be taken up by the pulley 10, and the inner side (or the outer side) of the band 11 to be fed from the pulley 10, so that the actuator arm 7 is rotated clockwise (or counterclockwise) around the pivot shaft 6, and causes the magnetic head 3 to radially move inwardly (or outwardly) on the magnetic disk 1 and to access a desired record track.

Satisfactory function of the disk drive requires that the magnetic head 3 access or be positioned with respect to the record track on the magnetic disk within a predetermined error or tolerance, for example, several microns. This means that, if any relative displacement is caused between the magnetic head 3 and the record track because of temperature change, temperature compensation should be always provided to assure that the magnetic head 3 is correctly aligned with the record track.

The actuator assembly has a magnetic head temperature compensating mechanism for performing temperature compensation that comprises a connecting structure consisting of the band 11 and the springs 12 and 13 for connecting the pulley 10 and the movable member 4 (constituting a spring system), and the movable member 4 of which two points are secured to the band 11 through the springs 12 and 13. The difference between the linear expansion coefficients of the band 11 and the element between two points of the spring support 9 causes relative change in length between both components as a result of temperature change, which relative change in length is converted into force by the spring system that consists of the band 11 and the springs 12 and 13. Said force varies the force of the spring system that is balanced for the previous temperature, which system rotates the movable member around the pivot shaft 6 to balance said variation in force, so that it compensates the displacement between the magnetic head and the record track because of the temperature change.

Figure 3:
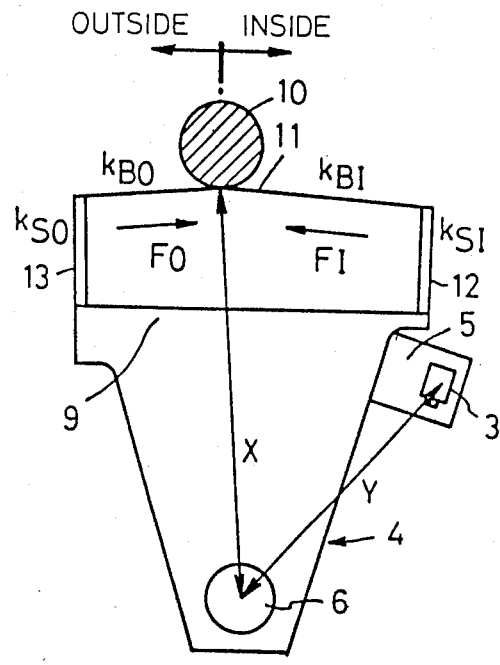
FIG. 3 shows a partial schematic view, partly in section, illustrating the operation of the mechanism of FIG. 1.

FIG. 3 schematically illustrates the effect of the temperature compensating mechanism for positioning of the magnetic head. Inside denotes the side close to the center of the magnetic disk bordering on the pulley 10, while the outside denotes the side far from the center. The following symbols are defined to explain the effect of the mechanism:

$K_{BO}$ = Spring coefficient at the outside of the band 11
$K_{BI}$ = Spring coefficient at the inside of the band 11
$K_{SO}$ = Spring coefficient of the spring (outside) 13
$K_{SI}$ = Spring coefficient of the spring (inside) 12
$K_O$ = Spring coefficient of the spring system constituted by $K_{BO}$ and $K_{SO}$
$K_I$ = Spring coefficient of the spring system constituted by $K_{BI}$ and $K_{SI}$
a = Linear expansion coefficient of the band 11 (stainless steel)
b = Linear expansion coefficient of the spring support 9 (aluminum)
α = Linear expansion coefficient of the head suspension 5
$F_I$ = Force on the band 11 (inside) generated by temperature change
$F_O$ = Force on the band 11 (outside) generated by temperature change
$δ_I$ = Amount of relative displacement of the band 11 to the spring support 9 generated by temperature change (inside)
$δ_O$ = Amount of relative displacement of the band 11 to the spring support 9 generated by temperature change (outside)
Δδ = Amount of movement of the movable member 4 at the position of the band 11 generated by temperature change
ΔT = Amount of temperature change ($T_2$ (after change) - $T_1$ (before change))

The pulley 10 can be considered by the hold torque of step motor to be in a relatively fixed state compared with the pivot shaft 6. Therefore, the amount of temperature compensation can be calculated as follows by taking the balance of force around the pivot shaft 6 into consideration.

The band 11 is made of stainless steel and has a linear expansion coefficient a, while the spring support 9 is made of aluminum and has a linear expansion coefficient b. Therefore, when the temperature rises, band 11 contracts relative to the spring support 9 mounted therewith because of such difference in the linear expansion coefficients. If the amount of contraction is $δ_I$ for the inside from the pulley 10 and $δ_O$ for the outside, $$δ_I = (T_2 - T_1)(b-a) \times l_I \quad (1)$$

$$δ_O = (T_2 - T_1)(b-a) \times l_O$$

where $l_I$ and $l_O$ are the inside and the outside length of the band 11, respectively. The relative contraction in the equation (1) is converted to force through the spring system consisting of the band 11 and the spring 12 or 13.

$$F_I = K_I δ_I = K_I (b-a) l_I ΔT \quad (2)$$

$$F_O = K_O δ_O = K_O (b-a) l_O ΔT$$

where $K_I$ and $K_O$ are the spring coefficients of the spring system consisting of the band 11 and the spring 12 or 13, which are calculated by the following equation:

$$K_I = \frac{1}{1/K_{BI} + 1/K_{SI}} \quad (3)$$

$$K_O = \frac{1}{1/K_{BO} + 1/K_{SO}}$$

The movable member 4 rotates around the pivot shaft 6 to balance the force $F_O$ and $F_I$ expressed by the equation (2). If Δδ is the movement of the movable member 4 on the band 11 around the pivot shaft 6 required to reach the balance with such relative contraction of the band 11 due to the temperature rise, the following relation is established:

$$F_O = K_O Δδ = F_I - K_I Δδ \quad (4)$$

Therefore, from the equation (4) the movement Δδ is:

$$Δδ = \frac{F_I - F_O}{K_O + K_I} = \frac{K_I l_I - K_O l_O}{K_O + K_I}(b-a) ΔT \quad (5)$$

Figure 4:
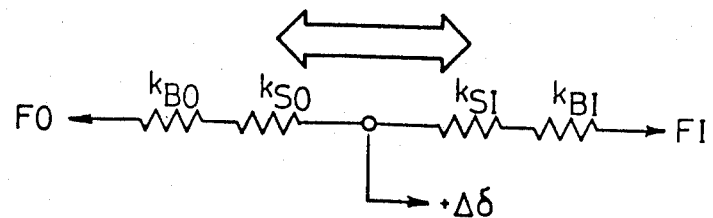
FIG. 4 shows a spring system diagram of the embodiment of FIG. 1 for explaining the operation of said embodiment.

Here, the symbol for Δδ is positive in the direction to relatively move the magnetic head 2 outwardly. FIG. 4 shows the movement Δδ and a schematic view of the spring system consisting of the band 11 and the spring 12 or 13.

The movement Δδ as described is nothing but the movement of the movable member 4 on the band 11. To make the movement Δδ the amount of temperature compensation, the ratio between the distance Y (the center of the pivot shaft 6 to the magnetic head 3) and the distance X (the center of the pivot shaft 6 to the band 11) must be determined. If this ratio is C = Y/X, the amount of temperature compensation, or the distance that the magnetic head 3 is moved by the temperature compensating mechanism for positioning of the magnetic head, becomes CΔδ.

The amount of temperature compensation CΔδ acts to offset the relative displacement, or the misposition, between the magnetic head 3 and the record track due to temperature change. In order to calculate the displacement between the magnetic head 3 and the record track due to the temperature change, all the components of the magnetic disk drive other than the abovementioned temperature compensating mechanism are made of aluminum. Then, since all components other than the head suspension are of aluminum, they expand or contract in a same ratio to temperature change, so that no displacement or misposition is caused between the magnetic head 3 and the record track on the magnetic disk. Therefore, only the head suspension causes the misposition between the magnetic head 3 and the record track. The amount of misposition can be calculated by the following equation if the length of the head suspension is L:

$$L \times (b - a) \times \Delta T \qquad (6)$$

This amount of misposition is the amount required to outwardly shift the magnetic head 3 relative to the record track.

By adding the amount of temperature compensation $\Delta\delta$ by the above-mentioned temperature compensating mechanism to the amount of misposition due to the temperature change, the net amount of TTS (thermal track shift) between the magnetic head 3 and the record track according to the temperature variation is:

$$TTS = C\Delta T (b - a) \frac{K_I l_I - K_O l_O}{K_O + K_I} + L (b - a) \Delta T \qquad (7)$$

$$TTS_{CTR} = \frac{1}{2} C\Delta T (b - a) \frac{K_I l_I - K_O l_O}{K_O + K_I} + L (b - a) \Delta T \qquad (8)$$

Figure 5:
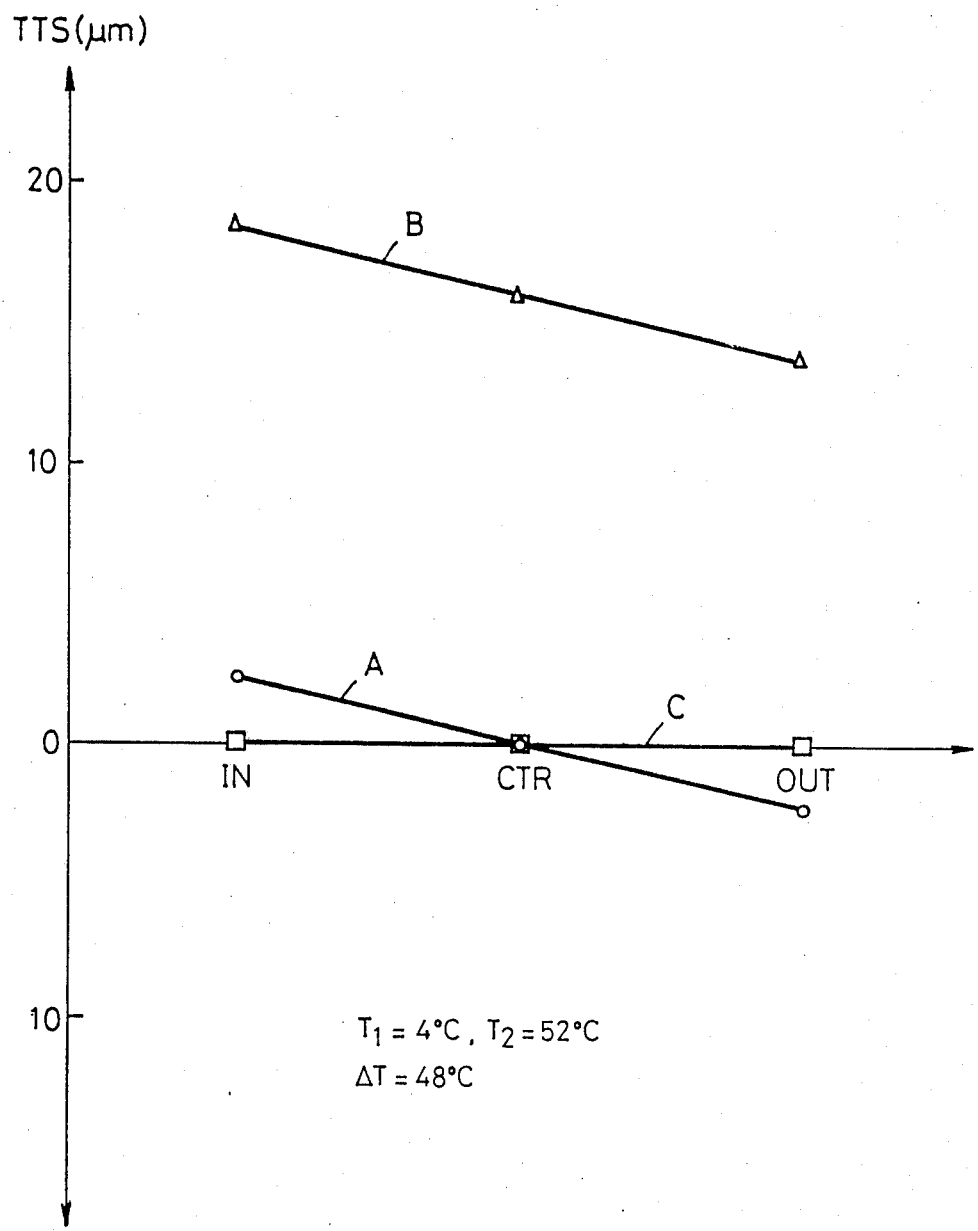
FIG. 5 shows a diagram illustrating the TTS (thermal track shift) of the magnetic head from each track where $\Delta T = 48°$ C. ($T_2 = 52°$ C. and $T_1 = 4°$ C.), with TTS on the ordinates and the track location on the abscissas.

Since the net amount of TTS (7) depends on the inner length $l_I$ and the outer length $l_O$ of the band 11, or the location of track, the spring coefficients $K_I$ and $K_O$, or the spring coefficients $K_{SO}$ and $K_{SI}$ of the springs 12 and 13 are selected to make the $TTS_{CTR}$ (8) at the central track CTR ($l_I=1/2$, $l_O=1/1$) zero. The line A in the graph of FIG. 5 shows the TTS at $\Delta T=48°$ C. by making $T_1=4°$ C., $T_2=52°$ C. Thus, as shown in A, it becomes possible to keep the TTS within desired plus or minus several microns for all tracks. The line B in the graph of FIG. 5 shows the TTS values at the same temperature variation between the magnetic head and the record track where the temperature compensating mechanism of the embodiment is not provided, which obviously exceeds the allowable limit. The inclination of the series of values represented by line A mainly depends on the difference of the linear expansion coefficients for the band 11 and the spring support 9.

Figure 6:
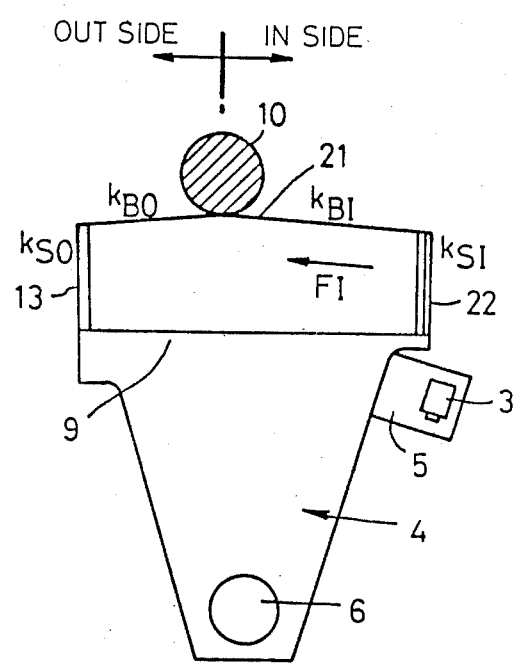
FIG. 6 shows a view, similar to FIG. 3, schematically illustrating the temperature compensating mechanism for positioning a magnetic disk drive magnetic head in accordance with a second embodiment of the invention.

FIG. 6 shows the second embodiment, wherein same amount of temperature compensation is provided regardless the position of track. In this embodiment, the band 21 has the same linear expansion coefficient as that of material constituting the element between two points of the spring support 9. It is arranged such that no relative change in length is caused between both elements even when temperature changes. Furthermore, in this embodiment, the spring 22 is of a bimetal structure and causes displacement in proportion to temperature change. All other arrangements are the same as the previous embodiment. The effect of the temperature compensating mechanism of this embodiment is explained by using the same symbols as described for the previous embodiment. If temperature changes, the bimetal spring 22 displaces in the longitudinal direction of the band 21 in proportion to the temperature change, and therefore it is considered that the inner length of the band 21 varies by $\Delta_I$ to the spring support 9. Namely, $$\delta_I = (T_2 - T_1) \times P$$

where P is displacement of the bimetal spring 22 per unit temperature in the longitudinal direction of the band 22.

On the other hand, there is no relative change in length of the band 21 to the outer spring support 9, and $\delta_O=0$).

The relative change in length of the inner side of band 21 is converted into force through the spring system.

$$F_I = K_I \delta_I = K_I P(T_2 - T_1)$$

On the other hand, $F_O=0$. If $\Delta\delta$ is the movement of the movable member 4 around the pivot shaft 6 on the band 21 to balance these force $F_I$ and $F_O$, the following relationship is established:

$$K_O \Delta\delta = F_I - K_I \Delta\delta$$

Thus, the movement $\Delta\delta$ is:

$$\Delta\delta = \frac{F_I}{K_O + K_I} = \frac{K_I P(T_2 - T_1)}{K_O + K_I}$$

A proportional constant C is multiplied to make the above the displacement at the location of magnetic head 3, or the amount of temperature compensation for the magnetic head 3:

$$C\Delta\delta = \frac{CK_I P(T_2 - T_1)}{K_O + K_I} = \frac{CK_I P\Delta\delta}{K_O + K_I}$$

The temperature compensation $C\Delta\delta$ depends on the temperature change $\Delta T$, the unit displacement P of the bimetal and the spring coefficients $K_I$ and $K_O$, but does not depend on the length ($l_I$ and $l_O$) of the band 21. Therefore, differing from the previous embodiment, this embodiment provides the same amount of temperature compensation $C\Delta\delta$ to all tracks. This eliminates the displacement between the magnetic head 3 and the record track as indicated by the equation (6) to zero for all track locations. Thus, it is possible in this embodiment to make the net amount of TTs, which is a sum of the temperature compensation $C\Delta\delta$ and the misposition between the magnetic head and the record track, zero for all track locations. This condition is shown by C in FIG. 5 where $T_1=4°$ C., $T_2=52°$ C. and $\Delta T=48°$ C.

Although, in the embodiments described above, the movable member 4 constitutes a rotary actuator, it may, of course, constitute a linear actuator that moves linearly. In addition, the means in the invention that provides different spring coefficients to one half of the connecting structure and the other half bordering on the pulley may be one that changes the spring coefficient for the portion of band close to the center of the disk from pulley and the portion far from the center. These spring coefficients may be varied by, for example, changing the thickness of the band. Furthermore, the means for relatively varying the length of the connection by providing the same linear expansion coefficient to the band and the material constituting the element between two points of the movable member, but a different linear expansion coefficient to the material constituting the pulley.

As described, this invention can provide a temperature compensating mechanism for positioning a magnetic head of a magnetic disk drive that is relatively low cost, has a simple construction and can be easily adjusted. Since, in the invention, the mechanism providing temperature compensation is definite and the amount of the compensation is easily calculated, it can be easily designed to provide optimum temperature compensation to various magnetic disk drives. Furthermore, the first embodiment can be easily adjusted to provide optimum amount of temperature compensation because the spring coefficient of the connecting structure can be easily changed, for example, by only changing the thickness or the length of the leaf spring. In addition, the second embodiment can perform more accurate temperature compensation because it can always provide same amount of the temperature compensation regardless of track location.

What is claimed is:

1. A temperature compensating mechanism for positioning a magnetic head of a magnetic disk drive that comprises a movable member supporting said magnetic head, a pulley for driving said movable member, a connecting structure including a band connecting said pulley and two spaced points on said movable member and a pair of springs positioned respectively between each end of said band and each of said two spaced points on said movable member exerting a tensile force on said band, wherein said temperature compensating mechanism is characterized in that the spring coefficient of one half of said connecting structure for connecting the pulley with either one of said two points on the movable member and including one of said pair of springs and the spring coefficient of the other half of the connecting structure including the other of said pair of springs for connecting the pulley with the other of said two spaced points on the movable member are chosen by choosing the respective spring coefficients of said pair of springs so that displacement between the magnetic head and a record track on a magnetic disk caused by temperature change is compensated by the force generated by the connecting structure resulting from the change in length between the two points on the movable member and the connecting structure caused by said temperature change.

2. The temperature compensating mechanism of claim 1 wherein a linear expansion coefficient for said band is different from that of an element between said two points of said movable member so that a relative change in length occurs between said two spaced points of said movable member and said connecting structure.

3. The temperature compensating mechanism of claim 1 wherein at least one of said springs is a bimetal.

* * * * *